United States Patent
Meng

(10) Patent No.: US 9,118,748 B2
(45) Date of Patent: Aug. 25, 2015

(54) VOICE LOOPBACK METHOD, GATEWAY AND LOOPBACK NODE IN VOIP NETWORK

(75) Inventor: Bin Meng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 507 days.

(21) Appl. No.: 13/367,867

(22) Filed: Feb. 7, 2012
(Under 37 CFR 1.47)

(65) Prior Publication Data

US 2012/0134277 A1 May 31, 2012

Related U.S. Application Data

(63) Continuation of application No. PCT/CN2010/075468, filed on Jul. 27, 2010.

(30) Foreign Application Priority Data

Aug. 7, 2009 (CN) .......................... 2009 1 0161058

(51) Int. Cl.
*H04L 12/26* (2006.01)
*H04M 7/00* (2006.01)
(Continued)

(52) U.S. Cl.
CPC .......... *H04M 7/0084* (2013.01); *H04L 43/0817* (2013.01); *H04L 65/103* (2013.01); *H04M 3/2236* (2013.01)

(58) Field of Classification Search
CPC ............. H04L 43/0817; H04L 65/103; H04M 7/0084; H04M 3/2236
USPC .................................. 370/242, 249; 709/242
See application file for complete search history.

(56) References Cited

U.S. PATENT DOCUMENTS

| 5,784,558 A | 7/1998 | Emerson et al. |
| 6,466,548 B1 | 10/2002 | Fitzgerald |

(Continued)

FOREIGN PATENT DOCUMENTS

| CN | 1909470 A | 2/2007 |
| CN | 101309487 A | 11/2008 |

(Continued)

OTHER PUBLICATIONS

Office Action issued in corresponding Chinese Patent Application No. 200910161058,3, mailed Aug. 16, 2012.
Written Opinion of the International Searching Authority issued in corresponding PCT Patent Application No. PCT/CN2010/075468, mailed Nov. 25, 2010.
International Search Report issued in corresponding PCT Patent Application No. PCT/CN2010/075468, mailed Nov. 25, 2010.

(Continued)

*Primary Examiner* — Pao Sinkantarakorn
*Assistant Examiner* — Richard Chang
(74) *Attorney, Agent, or Firm* — Brinks Gilson & Lione

(57) ABSTRACT

A voice loopback method, a gateway and a loopback node in a VoIP network and a network are provided. The voice loopback method in a VoIP network includes: sending, by a gateway, an internet control message protocol ICMP message, where a destination address of the ICMP message is an address of the loopback node, and the ICMP message includes a voice packet to be detected; and receiving a response message of the ICMP message sent by the loopback node, where the response message includes a loopback voice packet, and the loopback voice packet is obtained by the loopback node according to the voice packet to be detected that is included in the received ICMP message. Through application of the technical solutions according to the embodiments of the present invention, voice loopback in a VoIP network is achieved.

11 Claims, 3 Drawing Sheets

(51) Int. Cl.
*H04L 29/06* (2006.01)
*H04M 3/22* (2006.01)

(56) References Cited

U.S. PATENT DOCUMENTS

| | | | |
|---|---|---|---|
| 6,973,042 | B1 | 12/2005 | Fitzgerald |
| 7,454,494 | B1 | 11/2008 | Hedayat et al. |
| 2006/0045021 | A1 | 3/2006 | Deragon et al. |
| 2006/0159025 | A1 | 7/2006 | Abdo et al. |
| 2006/0174006 | A1 | 8/2006 | Hallenstal et al. |
| 2007/0025263 | A1 | 2/2007 | Dunlap et al. |
| 2007/0258700 | A1 | 11/2007 | Ivashin et al. |
| 2009/0006650 | A1* | 1/2009 | Saito .............................. 709/245 |

FOREIGN PATENT DOCUMENTS

| | | |
|---|---|---|
| CN | 101309505 A | 11/2008 |
| WO | WO 2011/015108 A | 2/2011 |

OTHER PUBLICATIONS

Office Action issued in corresponding Chinese Patent Application No. 200910161058.3, mailed Apr. 1, 2012.
Extended European Search Report issued in corresponding European Patent Application No. 10806012.0, mailed Jun. 1, 2012.
Carót et al., "Audible ICMP Echo Responses for Monitoring Ultra Low Delayed Audio Streams" Audio Engineer Society Convention Paper 7320. 124th Convention, Amsterdam, Netherlands, May 17-20, 2008.
Postel, "Internet Control Message Protocol" Darpa Internet Program—Network Working Group, Sep. 1981.
Reynolds et al., "Quality VoIP—an Engineering Challenge" BT Technology Journal, vol. 19, No. 2, Apr. 2001. XP-001034585.
Hedayat et al., "An Extension to the Session Description Protocol (SDP) for Media Loopback" Internet Draft, Feb. 18, 2009.
Office Action issued in corresponding Chinese Patent Application No. 200910161058.3, mailed Feb. 5, 2013.

* cited by examiner

VOICE LOOPBACK METHOD, GATEWAY AND LOOPBACK NODE IN VOIP NETWORK

CROSS-REFERENCE TO RELATED APPLICATIONS

This application is a continuation of International Application No. PCT/CN2010/075468, filed on Jul. 27, 2010, which claims priority to Chinese Patent Application No. 200910161058.3, filed on Aug. 7, 2009, both of which are hereby incorporated by reference in their entireties.

FIELD OF THE INVENTION

The present invention relates to the field of communications technologies, and in particular, to a voice loopback method, a gateway and a loopback node in a Voice over Internet Protocol VoIP network and the VoIP network.

BACKGROUND OF THE INVENTION

In a time division multiplexing (Time Division Multiplexing, TDM) network, the network tracks user calls to determine switches that the user calls pass. In the TDM network, voice information is transmitted in pulse-code modulation (Pulse-code modulation, PCM) stream mode after being encoded and decoded. Service personnel determine a loopback node of a user call, log in to a platform of a switch serving as the loopback node, search for a time slot used by the call at the switch, and then set that PCM streams received at the time slot from a gateway are directly output through a local loopback. That is, the PCM streams are output through an input port where the PCM streams are received. In this way, the PCM streams sent from the gateway are directly sent back to the gateway after being transmitted to the loopback node, thereby achieving voice loopback.

The disadvantage of the existing technology is as follows:
A voice loopback technology in the TDM network is provided in the prior art, but in the VoIP network, no voice loopback solution is provided.

SUMMARY OF THE INVENTION

Embodiments of the present invention provide a voice loopback method, a gateway and a loopback node in a VoIP network and the VoIP network, so as to achieve voice loopback in the VoIP network.

Accordingly, embodiments of the present invention provide the following technical solutions.

A voice loopback method in a VoIP network includes:
sending, by a gateway, an internet control message protocol ICMP message, where a destination address of the ICMP message is an address of a loopback node, and the ICMP message includes a voice packet to be detected; and
receiving a response message of the ICMP message sent by the loopback node, where the response message includes a loopback voice packet, and the loopback voice packet is obtained by the loopback node according to the voice packet to be detected that is included in the received ICMP message.

A gateway includes:
a sending unit, configured to send an internet control message protocol ICMP message, where a destination address of the ICMP message is an address of a loopback node, and the ICMP message includes a voice packet to be detected; and
a receiving unit, configured to receive a response message of the ICMP message sent by the loopback node, where the response message contains a loopback voice packet, and the loopback voice packet is obtained by the loopback node according to the voice packet to be detected that is included in the received ICMP message.

A loopback node provided includes:
a receiving unit, configured to receive an Internet control message protocol ICMP message sent by a gateway, where the ICMP message includes a voice packet to be detected;
an obtaining unit, configured to obtain a loopback voice packet according to the voice packet to be detected that is included in the received ICMP message; and
a sending unit, configured to send a response message of the ICMP message to the gateway, where the response message includes the loopback voice packet.

A VoIP network includes a gateway and a loopback node, where
the gateway is configured to send an internet control message protocol ICMP message, where a destination address of the ICMP message is an address of a loopback node, and the ICMP message includes a voice packet to be detected; and
the loopback node is configured to receive the ICMP message, obtain a loopback voice packet according to the voice packet to be detected that is included in the ICMP message, and send a response message of the ICMP message, where the response message includes the loopback voice packet.

The gateway is further configured to receive the response message of the ICMP message sent by the loopback node.

In the embodiments of the present invention, the internet control message protocol (Internet Control Message Protocol, ICMP) message sent by a gateway to a loopback node includes a voice packet to be detected. Because of the ICMP message, the loopback node knows that the voice packet included in the ICMP message needs to be sent back to the gateway. Therefore, the response message that is of the ICMP message and is received by the gateway includes a loopback voice packet. In this way, voice loopback is achieved in the VoIP network.

BRIEF DESCRIPTION OF THE DRAWINGS

To illustrate the technical solutions according to the embodiments of the present invention more clearly, the accompanying drawings for describing the embodiments are provided below. Apparently, the accompanying drawings in the following description are only some embodiments of the present invention, and persons skilled in the art can derive other drawings from the accompanying drawings without creative efforts.

DETAILED DESCRIPTION OF THE EMBODIMENTS

Embodiment 1

Figure 1:
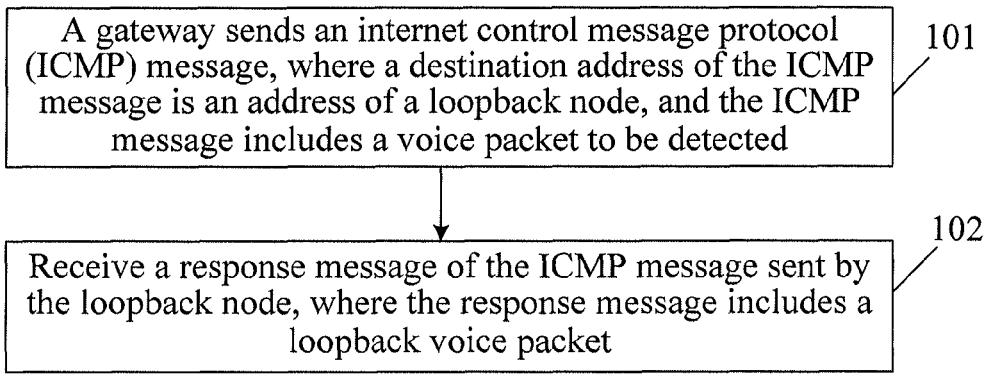
FIG. 1 is a flowchart of a voice loopback method in a VoIP network according to Embodiment 1 of the present invention.

Referring to FIG. 1, Embodiment 1 of the present invention provides a voice loopback method in a VoIP network, where the method includes the following steps:

101: A gateway sends an internet control message protocol ICMP message, where a destination address of the ICMP message is an address of a loopback node; the ICMP message includes a voice packet to be detected.

The ICMP message is a protocol message in the prior art. After receiving the ICMP message, a destination node knows that information included in the payload of the ICMP message needs to be sent back to the gateway. The embodiment of the present invention utilizes the characteristic of an ICMP message in the prior art to achieve voice loopback.

102: The gateway receives a response message of the ICMP message sent by the loopback node, where the response message includes a loopback voice packet, and the loopback voice packet is obtained by the loopback node according to the voice packet to be detected that is included in the received ICMP message.

In Embodiment 1 of the present invention, the ICMP message sent by the gateway to the loopback node includes a voice packet to be detected. Because of the ICMP message, the loopback node knows that the voice packet included in the ICMP message needs to be sent back to the gateway. Therefore, the response message that is of the ICMP message and is received by the gateway includes a loopback voice packet. In this way, voice loopback is achieved in the VoIP network.

Embodiment 2

Figure 2:
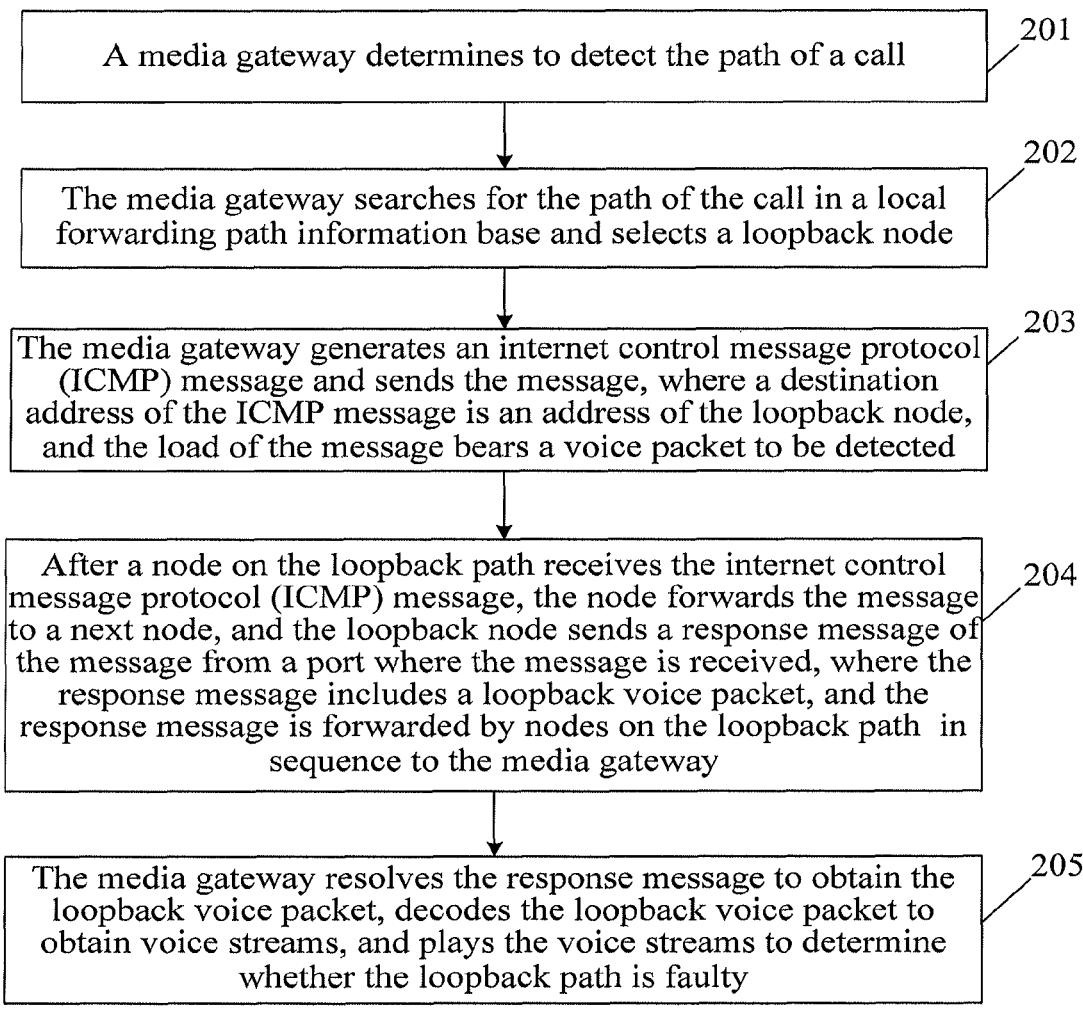
FIG. 2 is a flowchart of a voice loopback method in a VoIP network according to Embodiment 2 of the present invention.

Referring to FIG. 2, Embodiment 2 of the present invention provides a voice loopback method in a VoIP network. In this embodiment, voice loopback is performed after it is determined that the quality of a call is poor. A loopback voice packet can be used to locate a fault on the path of a call. The method includes the following steps:

201: A media gateway determines that the path of a call needs to be detected.

In this step, when it is detected that the voice quality of a call is poor, the media gateway determines that the path of the call needs to be detected to locate a fault.

202: The media gateway searches for the path of the call in a local forwarding path information base and selects a loopback node.

In this step, the media gateway searches for the path of the call in the local forwarding path information base according to an IP address pair of the call, where the forwarding path information base saves path information of multiple calls. The IP address pair includes a source gateway address and a destination gateway address of the call.

The selecting of the loopback node may adopt the following method: first, selecting an intermediate node on the path of a call as the loopback node, and if subsequent detection shows that voice quality looped back from the loopback node is good, selecting a node at a position after the intermediate node on the path of the call as the loopback node; and if subsequent detection shows that voice quality looped back from the loopback node is not good, selecting a node at a position before the intermediate node on the path of the call as the loopback node, where the nodes in the embodiment of the present invention refer to routers.

203: The media gateway encodes a voice stream to be detected to obtain a voice packet to be detected and generates an ICMP message and sends the ICMP message, where a destination address of the ICMP message is an address of the loopback node, and the payload of the ICMP message is a realtime transport protocol (RealTime Transport Protocol, RTP) message that bears the voice packet to be detected.

The voice stream to be detected in this step may be user's voice stream of the call.

It should be noted that, the length of the ICMP message needs to be the same as that of a normal voice message, and the differentiated service codepoint (Differentiated Service Codepoint, DSCP) in an IP header of the ICMP message needs to be the same as that of a voice message. The voice message refers to a voice message formed by encoding the user's voice stream by the media gateway, and is transmitted from a source gateway to a destination gateway. The voice message may be a user datagram protocol (User Datagram Protocol, UDP) packet, where the payload of the UDP packet is an RTP packet that bears a user's voice packet.

The reason why it is required that the differentiated service codepoint of the ICMP message is the same as the differentiated service codepoint of the voice message lies in that nodes on a loopback path (a path between the media gateway and the loopback node) use different processing policies for received messages according to different differentiated service codepoints. For example, according to different differentiated service codepoints, different processing priorities may be adopted and different bandwidth may be allocated for the received messages. To accurately locate a fault on the path of the call, it is required that the differentiated service codepoint of the ICMP message is the same as the differentiated service codepoint of the voice message, and it is also required that the length of the ICMP message is the same as the length of the voice message. In this way, the nodes (routers) on the loopback path may use the same processing policy, the same priority, and allocate the same bandwidth for the ICMP message as those of the voice message, so as to accurately simulate the transmission environment of the voice message. The loopback path refers to the path between the media gateway and the loopback node.

204: After a node on the loopback path receives the ICMP message, the node forwards the ICMP message to a next node. When the loopback node receives the ICMP message, the loopback node does not forward the ICMP message to a next node, but sends a response message of the ICMP message from a port where the ICMP message is received, where the response message includes a voice packet in the ICMP message received locally, and the voice packet in the ICMP message received locally serves as a loopback voice packet. The response message is forwarded to the media gateway in sequence by nodes on the loopback path until the media gateway receives the response message. The response message includes the loopback voice packet.

It should be noted that, an ID field in the ICMP message is used to transmit a message identification identifier. The message identification identifier is used to identify a ICMP message. When the loopback node generates a response message of the ICMP message, the response message includes the message identification identifier in the ICMP message, so that the media gateway can identify to which ICMP message the response message responds according to the ID in the response message when the media gateway receives the response message from a router side. In this way, the media gateway can determine the voice packet to be detected to which the loopback voice packet included in the response message corresponds.

Figure 3:
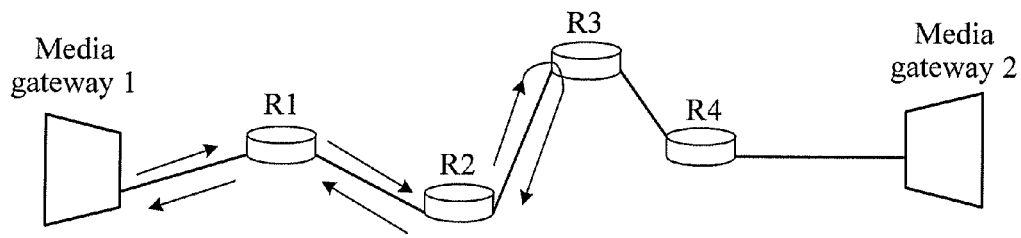
FIG. 3 is a schematic diagram of a voice loopback in a VoIP network according to Embodiment 2 of the present invention.

In this step, the loopback node receives an ICMP message, and a destination address of the ICMP message is the address of the loopback node, so the loopback node generates a response message of the ICMP message and sends the response message to the media gateway, where the response message includes the voice packet in the ICMP message, and in this case, the voice packet is called a loopback voice packet. As shown in FIG. 3, assume that the source gateway and the destination gateway of the call are a media gateway 1 and a media gateway 2 respectively, the path of the call is R1-R2-R3-R4, and the loopback node is a router R3. An ICMP message sent by the media gateway 1 is forwarded to the router R3 through the routers R1 and R2. Because the destination address included in the ICMP message is the address of the R3, the R3 generates a response message of the ICMP message and sends the ICMP message to the media gateway 1, where the response message includes the voice packet in the ICMP message, and in this case, the voice packet is called a loopback voice packet. The response message is forwarded to the media gateway 1 through the routers R2 and R1.

In the process of transmitting the ICMP message and the response message in the loopback path, if the path between two nodes is faulty, a part of its included voice packet content may be lost. If a certain node is faulty, the voice packet content may also be influenced. For example, the voice packet content may be modified. Therefore, if a loopback path is faulty, the content of the voice packet to be detected that is included in an ICMP message sent by the media gateway may be different from the content of the loopback voice packet included in the response message received by the media gateway.

205: The media gateway parses the response message to obtain the loopback voice packet, decodes the loopback voice packet to obtain the voice stream, and plays the voice stream to determine whether the loopback path is faulty.

Specifically, if the quality of the voice stream looped back from the loopback node is different from the quality of the voice stream to be detected, it indicates that the loopback path is faulty; otherwise, it indicates that the loopback path is not faulty.

In this step, the media gateway may also compare the content of the voice packet to be detected with the content of the loopback voice packet, and determine whether the path between the media gateway and the loopback node is faulty according to a comparison result. Whether the media gateway compares the content or not does not influence the implementation of the present invention.

The voice technical solution described in the foregoing embodiment is for easily locating a fault on the path of a call. The voice loopback technology may also be used for other purposes, which are not limited in the present invention.

In Embodiment 2 of the present invention, the ICMP message sent by the media gateway to the loopback node includes the voice packet to be detected. Because of the ICMP message, the loopback node knows that the voice packet included in the ICMP message needs to be sent back to the media gateway. Therefore, the media gateway receives the response message of the ICMP message, and the response message includes the loopback voice packet. In this way, voice loopback is achieved in the VoIP network. Further, the media gateway decodes the loopback voice packet to obtain a voice stream and directly plays the voice stream to determine whether the loopback path is faulty, thereby conveniently locating the fault on the path of the call. For example, operating personnel may remotely log in to a platform of the media gateway, set a loopback node, and then make a call to the media gateway to directly listen to the played voice effect, so as to determine whether the loopback path is faulty. Further, the voice loopback method according to the embodiment of the present invention is performed on a specific call path in implementation, and does not interfere with any other calls. Further, because the maximum traffic of one voice stream is 50 pps, 50 ICMP messages need to be sent per second at the most, not resulting in performance impacts on routers that receive the ICMP messages. Further, all routers at the IP bearer plane support ICMP messages, so the voice loopback technology can be easily promoted.

Figure 4:
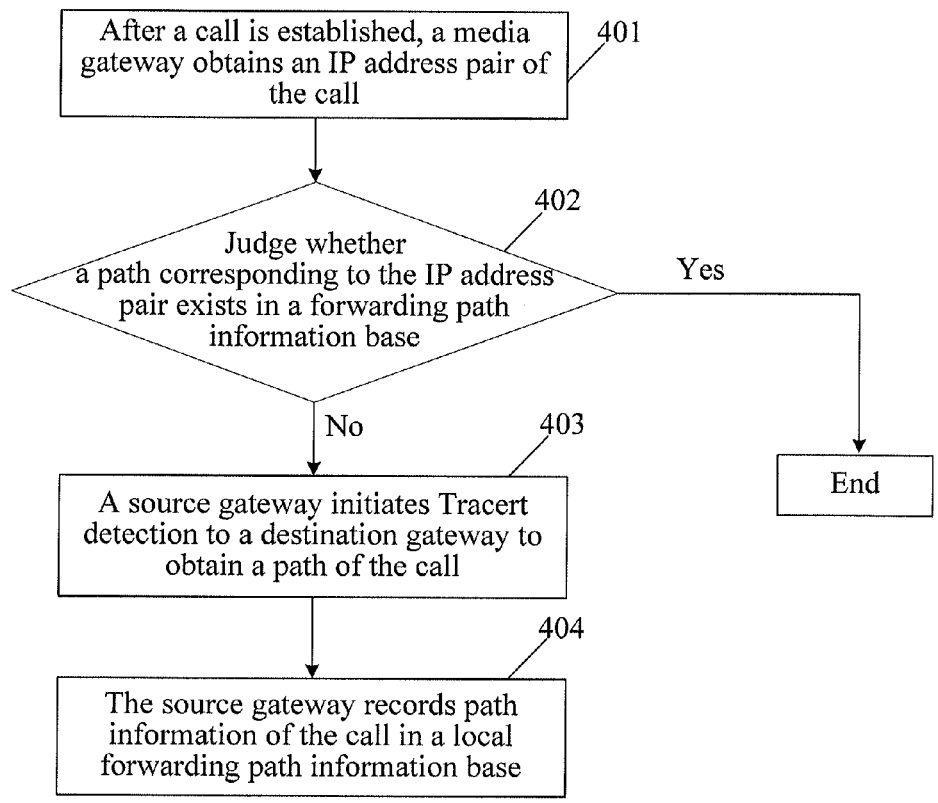
FIG. 4 is a flowchart of a method for obtaining the path of a call according to an embodiment of the present invention.

Referring to FIG. 4, how to obtain the path of a call is described as follows:

401: After a call is established, a media gateway obtains an IP address pair of the call, where the IP address pair includes a source gateway address and a destination gateway address.

The media gateway in this step is assumed to be the source gateway of the call.

402: The source gateway judges whether a path corresponding to the IP address pair exists in a forwarding path information base according to the IP address pair of the call. If a path corresponding to the IP address pair exists in the forwarding path information base, the process is complete; if a path corresponding to the IP address pair does not exist in the forwarding path information base, 403 is performed.

403: The source gateway initiates router tracking (Tracert) detection to a destination gateway according to the IP address pair. Specifically, the source gateway sends a detection message to the destination gateway, receives response messages of the detection message sent by multiple nodes, and determines whether the nodes that send the response messages are located in the path of the call according to the received response messages.

404: The source gateway records path information of the call in a local forwarding path information base.

It should be noted that, even if the media gateway supports a dynamic routing protocol, the Tracert detection needs to be initiated. The dynamic routing protocol refers to that a network is divided into multiple regions, and information of each region is shared by members within each region. Therefore, the media gateway merely knows routing information of the region where the media gateway is located, and cannot know routing information of other regions, so the Tracert detection needs to be initiated.

A media gateway may periodically initiate Tracert detection to the destination gateway of a call, so as to ensure that the detected path is the most accurate; or, the media gateway may also initiate Tracert detection after a call is established for the first time. If the path does not transfer any other calls within a preset time period, path information of the call recorded locally is deleted, and Tracert detection is initiated again for new calls; or, the media gateway may initiate Tracert detection after determining that a path of a call needs to be detected because of poor voice quality.

Embodiment 3

Figure 5:
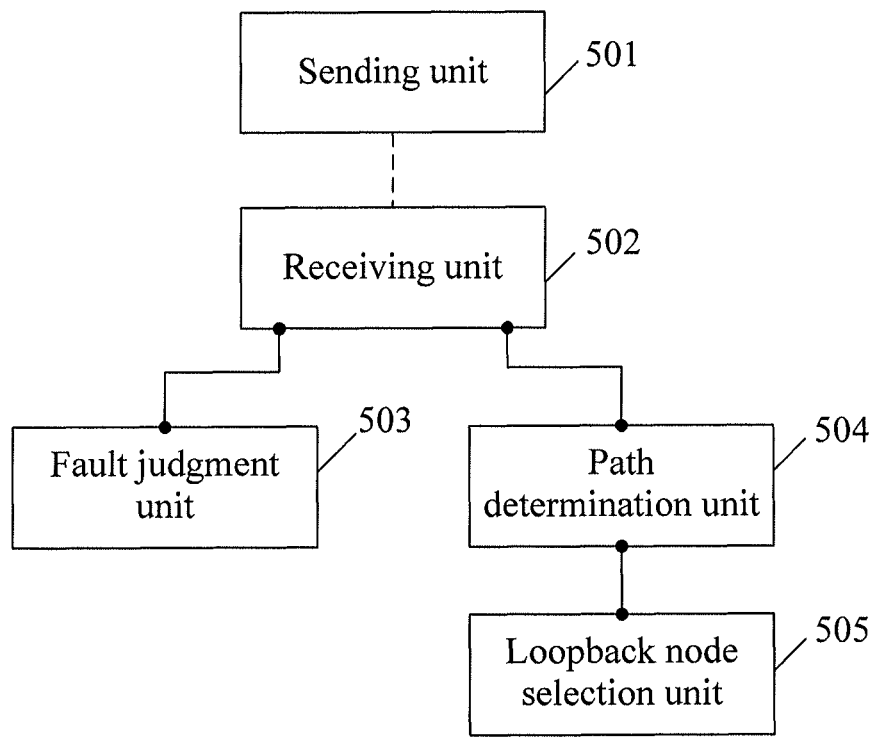
FIG. 5 is a structural diagram of a gateway according to Embodiment 3 of the present invention.

Referring to FIG. 5, Embodiment 3 of the present invention provides a gateway, where the gateway includes:

a sending unit 501, configured to send an internet control message protocol ICMP message, where a destination address of the ICMP message is an address of a loopback node; the ICMP message includes a voice packet to be detected; and a receiving unit 502, configured to receive a response message of the ICMP message sent by the loopback node, where the response message includes a loopback voice packet; the loopback voice packet is obtained by the loopback node according to the voice packet to be detected that is included in the ICMP message.

The sending unit 501 and the receiving unit 502 implement relatively independent functions. The functions of the two units are implemented in sequence. The dashed line in the FIG. 5 represents the logical connection of the two units.

The gateway further includes: a fault judgment unit 503, configured to determine whether the path between the gateway and the loopback node is faulty according to the loopback voice packet. Specifically, the fault determination unit 503 decodes the loopback voice packet to obtain a voice stream and play the voice stream to determine whether the loopback path is faulty; or, the fault determination unit 503 compares content of the voice packet to be detected with content of the loopback voice packet to determine whether the path between the gateway and the loopback node is faulty.

The length of the ICMP message is the same as that of a voice message, and the differentiated service codepoint of the ICMP message is the same as the differentiated service codepoint of the voice message. The reason why the DSCP of the ICMP message needs to be the same as the differentiated service codepoint of the voice message lies in that nodes on the loopback path (a path between the gateway and the loopback node) use different processing policies for received messages according to different differentiated service codepoints. For example, according to different differentiated service codepoints, different processing priorities may be adopted and different bandwidth may be allocated for the received messages. To accurately locate a fault on the path of the call, it is required that the differentiated service codepoint of the ICMP message is the same as the differentiated service codepoint of the voice message, and it is also required that the length of the ICMP message is the same as the length of the voice message. In this way, the nodes (routers) on the loopback path may use the same processing policy, the same priority, and allocate the same bandwidth for the ICMP message as those of the voice message, so as to accurately simulate the transmission environment of the voice message.

Specifically, the gateway is the source gateway of the call. In this case, the sending unit 501 is further configured to send a detection message to the destination gateway of the call when the source gateway determines that the path of the call needs to be detected; the receiving unit 502 is further configured to receive response messages of the detection message sent by intermediate nodes between the source gateway and the destination gateway; and the gateway further includes: a loopback node selection unit, configured to select a node from the intermediate nodes that send the response messages as the loopback node.

Or, the sending unit 501 sends a detection message to the destination gateway of the call after the call is established; the receiving unit 502 receives response messages of the detection message sent by intermediate nodes between the source gateway and the destination gateway. In this case, the gateway further includes: a path determination unit 504, configured to obtain the path of the call according to the received response messages of the detection message, and save path information of the call in a forwarding path information base, where nodes on the path of the call are nodes that send the response messages; and a loopback node selection unit 505, configured to obtain the path information of the call from the forwarding path information base and select a node on the path of the call as the loopback node.

In Embodiment 3 of the present invention, the ICMP message sent by the gateway to the loopback node includes a voice packet to be detected. Because of the ICMP message, the loopback node knows that the voice packet included in the ICMP message needs to be sent back to the gateway. Therefore, the gateway receives the response message of the ICMP message, and the response message includes the loopback voice packet. In this way, voice loopback is achieved in the VoIP network. Further, the gateway decodes the loopback voice packet to obtain a voice stream and directly plays the voice stream to determine whether the loopback path is faulty, thereby conveniently locating the fault on the path of the call.

For example, operating personnel may remotely log in to a platform of a media gateway, set a loopback node, and then make a call to the media gateway to directly listen to the played voice effect, so as to determine whether the loopback path is faulty. Further, the voice loopback solution according to the embodiment of the present invention is performed on a specific call path in implementation, and does not interfere with any other calls. Further, because the maximum traffic of one voice stream is 50 pps, 50 ICMP messages need to be sent per second at the most, not resulting in performance impacts on routers that receive the ICMP messages. Further, all routers at the IP bearer plane support ICMP messages, so the voice loopback technology can be easily promoted.

Embodiment 4

Figure 6:
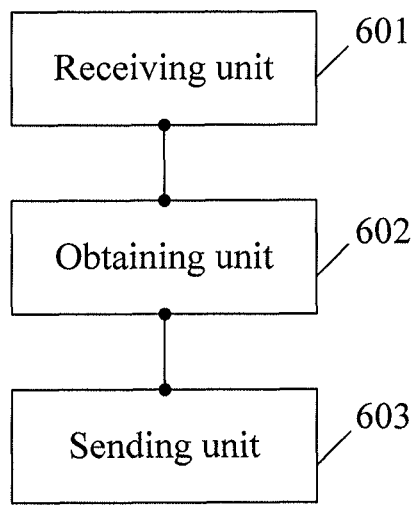
FIG. 6 is a structural diagram of a loopback node according to Embodiment 4 of the present invention.

Referring to FIG. 6, Embodiment 4 of the present invention provides a loopback node, where the loopback node includes:

a receiving unit 601, configured to receive an internet control message protocol ICMP message sent by a gateway, where the ICMP message includes a voice packet to be detected;

an obtaining unit 602, configured to obtain a loopback voice packet according to the voice packet to be detected that is included in the received ICMP message; and a sending unit 603, configured to send a response message of the ICMP message to the gateway, where the response message includes the loopback voice packet.

The ICMP message includes the voice packet to be detected and a destination address (an address of the loopback node) of the ICMP message. The loopback node determines that the voice packet included in the ICMP message needs to be sent back to the gateway locally according to the destination address.

The loopback node provided by Embodiment 4 of the present invention knows that the voice packet included in the ICMP message needs to be sent back to the gateway immediately after receiving the ICMP message from the gateway according to the characteristic of ICMP messages. In this way, voice loopback is achieved in the VoIP network.

Embodiment 5

Embodiment 5 of the present invention provides a VoIP network, where the VoIP network includes a gateway and a loopback node.

The gateway is configured to send an internet control message protocol ICMP message, where a destination address of the ICMP message is an address of the loopback node, and the ICMP message includes a voice packet to be detected.

The loopback node is configured to receive the ICMP message, obtain a loopback voice packet according to the voice packet to be detected that is included in the ICMP message, and send a response message of the ICMP message, where the response message includes the loopback voice packet.

The gateway is further configured to receive the response message of the ICMP message sent by the loopback node.

To detect whether the path between the gateway and the loopback node is faulty, the gateway is further configured to decode the loopback voice packet to obtain a voice stream, and play the voice stream to determine whether the path between the gateway and the loopback node is faulty; or, compare content of the voice packet to be detected with content of the loopback voice packet to determine whether the path between the gateway and the loopback node is faulty.

The loopback node may specifically be a router.

In Embodiment 5 of the present invention, the ICMP message sent by the gateway to the loopback node includes a voice packet to be detected. Because of the ICMP message, the router serving as the loopback node knows that the voice packet included in the ICMP message needs to be sent back to the gateway. Therefore, the gateway receives the response message of the ICMP message, and the response message includes the loopback voice packet. In this way, voice loopback is achieved in the VoIP network. Further, the gateway decodes the loopback voice packet to obtain a voice stream, and plays the voice stream to determine whether the loopback path is faulty.

Persons skilled in the art may understand that all or part of the steps of the method according to the embodiments of the present invention may be implemented by a program instructing relevant hardware. The program may be stored in a computer readable storage medium such as a Read-Only Memory (ROM), a magnetic disk or an optical disk.

The voice loopback method, the gateway and the loopback node in a VoIP network and the network according to the embodiments of the present invention are described in detail above. The principle and implementation of the present invention are described herein through specific examples. The description about the embodiments of the present invention is merely provided for ease of understanding of the method and core ideas of the present invention. Persons skilled in the art can make variations and modifications to the present invention in terms of the specific implementations and application scopes according to the ideas of the present invention. Therefore, the specification shall not be construed as a limit to the present invention.

What is claimed is:

1. A voice loopback method in a Voice over Internet Protocol (VoIP) network, comprising:
   sending, by a gateway, an internet control message protocol (ICMP) message, wherein a destination address of the ICMP message is an address of a loopback node, and the ICMP message comprises a voice packet to be detected; and
   receiving, by the gateway, a response message of the ICMP message sent by the loopback node, wherein the response message comprises a loopback voice packet that is obtained by the loopback node according to the voice packet to be detected; and
   after receiving the response message of the ICMP message sent by the loopback node, determining, by the gateway, whether a path between the gateway and the loopback node is faulty according to a comparison result by comparing content of the voice packet to be detected with content of the loopback voice packet;
   wherein a length of the ICMP message is the same as a length of a voice message, and a differentiated service codepoint of the ICMP message is the same as a differentiated service codepoint of the voice message.

2. The method according to claim 1, wherein determining whether a path between the gateway and the loopback node is faulty comprises: decoding, by the gateway, the loopback voice packet to obtain a voice stream, and playing the voice stream to determine whether the path between the gateway and the loopback node is faulty, wherein if quality of the voice stream looped back from the loopback node is different from quality of the a voice stream to be detected which is encoded by the gateway to obtain the voice packet to be detected, it indicates that the path is faulty, otherwise, it indicates that the path is not faulty.

3. The method according to claim 1, wherein
   the gateway is a source gateway of a call; and
   before the sending, by gateway, the ICMP packet, the method further comprises:
   sending, by the source gateway, a detection message to a destination gateway of the call after determining that a path of the call needs to be detected, receiving response messages of the detection message sent by intermediate nodes between the source gateway and the destination gateway, and selecting a node from the intermediate nodes that send the response messages as the loopback node.

4. The method according to claim 1, wherein
   the gateway is a source gateway of a call; and
   before the sending, by the gateway, the ICMP packet, the method further comprises:
   sending, by the source gateway, a detection message to a destination gateway of the call, receiving response messages of the detection message sent by intermediate nodes between the source gateway and the destination gateway, obtaining a path of the call according to the received response messages, and saving path information of the call in a forwarding path information base, wherein nodes on the path of the call are nodes that send the response messages; and
   obtaining, by the source gateway, the path information of the call from the forwarding path information base after determining that the path of the call needs to be detected, and selecting a node on the path of the call as the loopback node.

5. The method according to claim 1, wherein
   an ID field in the ICMP message is used to transmit a message identification identifier, wherein the message identification identifier is used to identify a ICMP message, and the response message of the ICMP message generated by the loopback node comprises the message identification identifier in the ICMP message.

6. A gateway, comprising:
   a sending unit, configured to send an internet control message protocol (ICMP) message, wherein a destination address of the ICMP message is an address of a loopback node, and the ICMP message comprises a voice packet to be detected;
   a receiving unit, configured to receive a response message of the ICMP message sent by the loopback node, wherein the response message comprises a loopback voice packet, and the loopback voice packet that is obtained by the loopback node according to the voice packet to be detected; and
   a fault judgment unit, configured to determine whether a path between the gateway and the loopback node is faulty according to a comparison result by comparing content of the voice packet to be detected with content of the loopback voice packet;
   wherein a length of the ICMP message is the same as a length of a voice message, and a differentiated service codepoint of the ICMP message is the same as a differentiated service codepoint of the voice message.

7. The gateway according to claim 6, wherein the fault judgment unit is configured to:
   decode the loopback voice packet to obtain a voice stream, and play the voice stream to determine whether the path between the gateway and the loopback node is faulty, wherein if quality of the voice stream looped back from the loopback node is different from quality of a voice stream to be detected which is encoded to obtain the voice packet to be detected, it indicates that the path is faulty, otherwise, it indicates that the path is not faulty; or, compare content of the voice packet to be detected with content of the loopback voice packet to determine whether the path between the gateway and the loopback node is faulty.

8. The gateway according to claim 6, wherein the gateway is a source gateway of a call;
the sending unit is further configured to send a detection message to a destination gateway of the call after determining that a path of the call needs to be detected;
the receiving unit is further configured to receive response messages of the detection message sent by intermediate nodes between the source gateway and the destination gateway; and
the gateway further comprises:
a loopback node selection unit, configured to select a node from the intermediate nodes that send the response messages as the loopback node.

9. The gateway according to claim 6, wherein the gateway is a source gateway of a call;
the sending unit is further configured to send a detection message to a destination gateway of the call;
the receiving unit is further configured to receive response messages of the detection message sent by intermediate nodes between the source gateway and the destination gateway; and
the gateway further comprises:
a path determination unit, configured to obtain a path of the call according to the received response messages of the detection message, and save path information of the call to a forwarding path information base, wherein nodes on the path of the call are nodes that send the response messages; and
a loopback node selection unit, configured to obtain the path information of the call from the forwarding path information base, and select a node on the path of the call as the loopback node.

10. A Voice over Internet Protocol (VoIP) network, comprising a gateway and a loopback node, wherein
the gateway is configured to send an internet control message protocol (ICMP) message, wherein a destination address of the ICMP message is an address of a loopback node, and the ICMP message comprises a voice packet to be detected;
the loopback node is configured to receive the ICMP message, obtain a loopback voice packet according to the voice packet to be detected, and send a response message of the ICMP message, wherein the response message comprises the loopback voice packet;
the gateway is further configured to receive the response message of the ICMP message sent by the loopback node; and
the gateway is further configured to determine whether a path between the gateway and the loopback node is faulty according to a comparison result by comparing content of the voice packet to be detected with content of the loopback voice packet;
wherein a length of the ICMP message is the same as a length of a voice message, and a differentiated service codepoint of the ICMP message is the same as a differentiated service codepoint of the voice message.

11. The VoIP network of claim 10, the gateway is configured to decode the loopback voice packet to obtain a voice stream, and play the voice stream to determine whether the path between the gateway and the loopback node is faulty, wherein if quality of the voice stream looped back from the loopback node is different from quality of a voice stream to be detected which is encoded to obtain the voice packet to be detected, it indicates that the path is faulty, otherwise, it indicates that the path is not faulty; or compare content of the voice packet to be detected with content of the loopback voice packet, and determine whether the path between the gateway and the loopback node is faulty according to a comparison result.

* * * * *